(12) United States Patent
Heggemann et al.

(10) Patent No.: US 6,675,420 B1
(45) Date of Patent: Jan. 13, 2004

(54) CUTTING DEVICE FOR A TOOL, IN PARTICULAR FOR A SCREW DRIVER

(75) Inventors: Christian Heggemann, Detmold (DE); Armin Herzog, Detmold (DE)

(73) Assignee: Weidmüller Interface GmbH & Co., Detmold (DE)

( * ) Notice: Subject to any disclaimer, the term of this patent is extended or adjusted under 35 U.S.C. 154(b) by 0 days.

(21) Appl. No.: 10/192,779

(22) Filed: Jul. 10, 2002

(51) Int. Cl.$^7$ .............................................. B25B 15/00
(52) U.S. Cl. .......................................................... 7/165
(58) Field of Search .................... 7/165, 129, 108, 7/113, 156, 157

(56) References Cited

U.S. PATENT DOCUMENTS 3,138,044 A * 6/1964 Olexson ..................... 408/200
3,177,910 A * 4/1965 Da Silva .................... 81/177.2
6,243,902 B1 * 6/2001 Huang ............................ 7/165
6,453,564 B1 * 9/2002 Foley ........................... 30/359

* cited by examiner

*Primary Examiner*—Lee D. Wilson
(74) *Attorney, Agent, or Firm*—Henry M. Feiereisen; Ursula B. Day

(57) ABSTRACT

A cutting device for a tool, in particular also a screwdriver, has a clamping piece attachment for slipping onto a shaft of for example a screwdriver until it locks, and wherein an actuating lever provided with a cutting edge for cutting electrical cables or lines is pivotally supported at the clamping piece attachment, so that the actuating lever and/or the clamping piece attachment is able to cut an electrical cable or line.

16 Claims, 6 Drawing Sheets

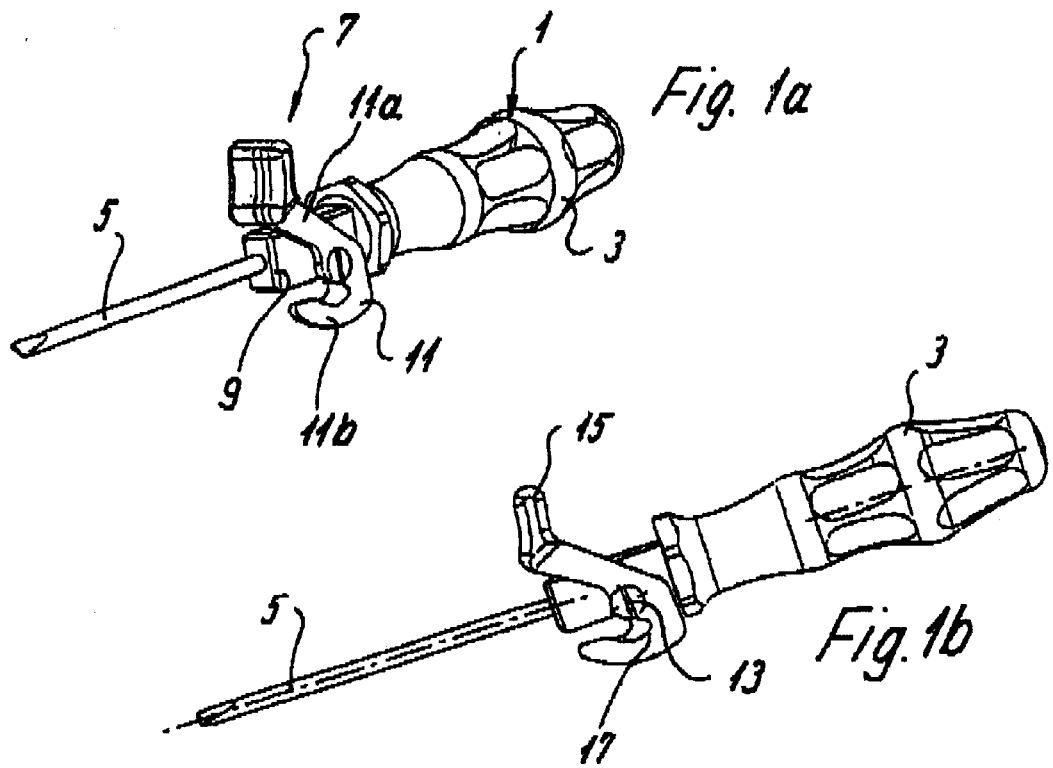
Fig. 1a
Fig. 1b
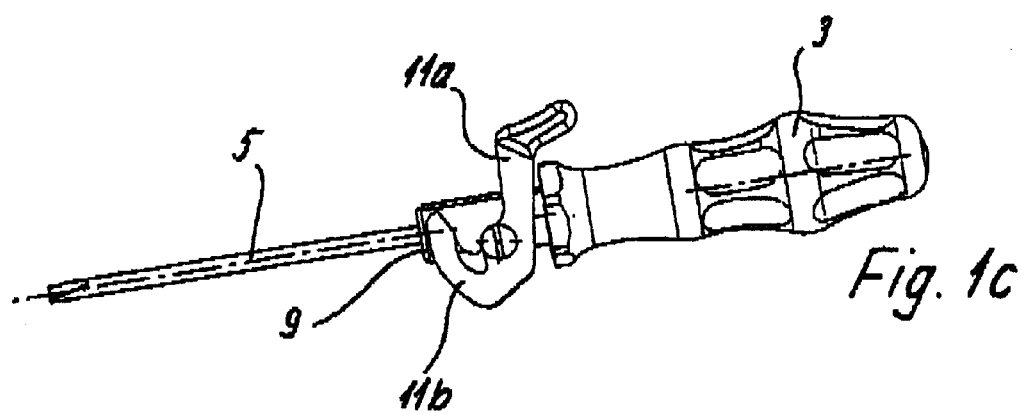
Fig. 1c
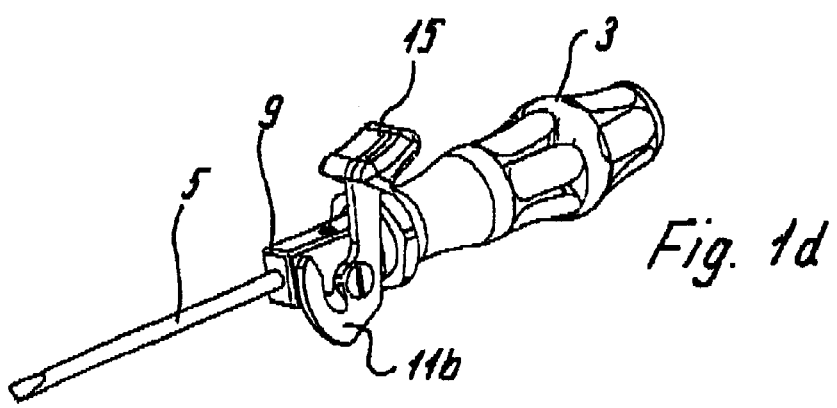
Fig. 1d

CUTTING DEVICE FOR A TOOL, IN PARTICULAR FOR A SCREW DRIVER

BACKGROUND OF THE INVENTION

The invention relates to a cutting device for a tool, in particular for a screwdriver, with a clamping piece attachment, which can be slipped onto the shank, in particular that of the screwdriver where it can be locked in place.

In particular for terminal blocks with an insulation-penetrating cutting connector, it is necessary to first sever the cable and then to insert it by means of a screwdriver into the insulation-penetrating cutting connector.

A solution of this type is for example known from the DE 299 18 557. For cutting the conduit, a pair of pliers for example must be used, which means it is necessary to operate with two tools, in order to wire the terminal blocks with a cutting connector.

From the DE 299 18 557 it is also known, to provide the screw driver with a clamping piece attachment, which forms a support for the conduit, wherein it is furthermore possible to add to the clamping piece attachment a spacer block, which simplifies insertion of the conduit for the connector device.

Although besides the screwdriver, it is still necessary to have a further tool ready for severing the conduit or the cable.

With this prior art as background, it is an object of the invention to provide a cutting device, which renders the wiring of insulation-penetrating cutting connectors easier, in particular of terminal blocks with insulation-penetrating cutting connectors.

SUMMARY OF INVENTION

This object is realized according to the invention by the subject matter of claim 1. Thus, the actuating lever and/or the clamping piece attachment is provided with a cutting edge for cutting the electrical cables or conduits.

The invention provides an advantage, in that the workman is able to cut the electrical conduit into sections with the same tool that is also used for wiring the clamp, prior to the actual insertion into the IDC clamping site. The constant changing of tools of heretofore single tools (screw driver/ cutting tool) utilized is thus eliminated, which leads to a time advantage in the field when wiring the cutting connectors.

The invention provides a cutting device, which can be retrofitted in a simple manner onto all commercially available screwdrivers. Of course, the invention can be augmented by the spacer pieces known from the prior art.

It is also conceivable to configure the clamping piece as a unitary piece and to thus sell the screwdriver with the clamping piece respectively, with the cutting device as a unit.

Preferred embodiments of the invention are provided in the dependent claims.

BRIEF DESCRIPTION OF THE SEVERAL VIEWS OF DRAWINGS

Figure 2A:
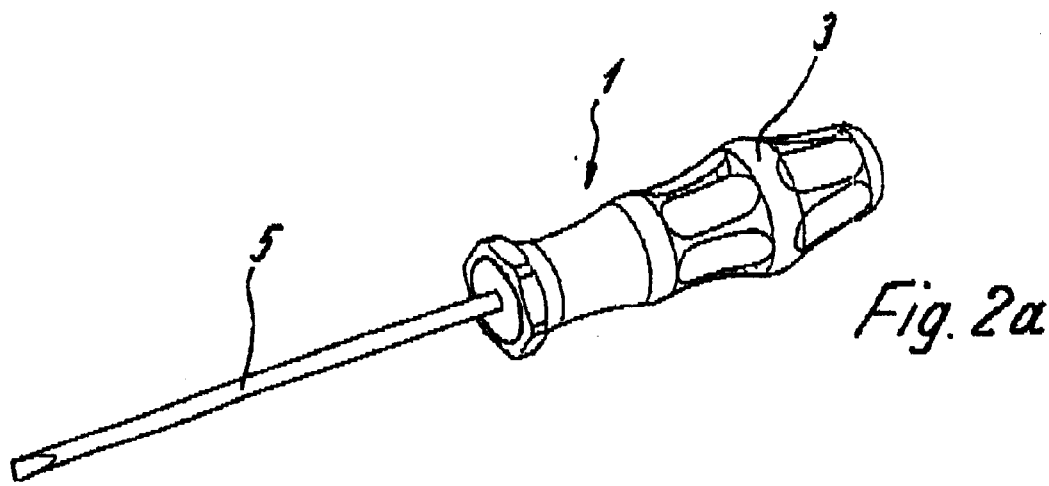
Figure 2B:
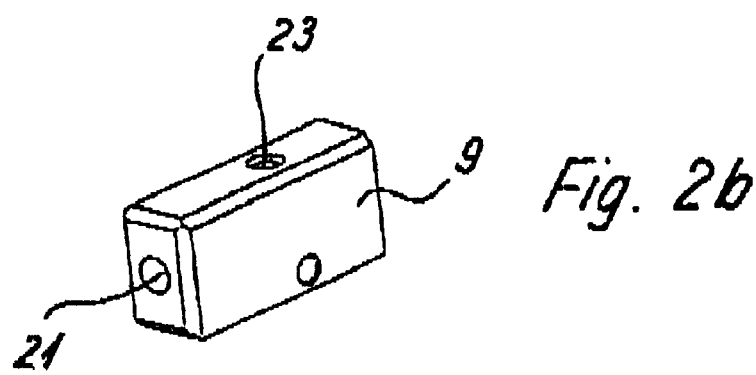
Figure 2C:
Figure 2D:
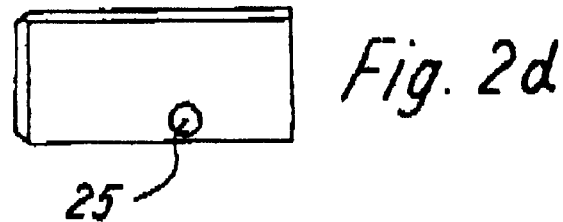
Figure 3A:
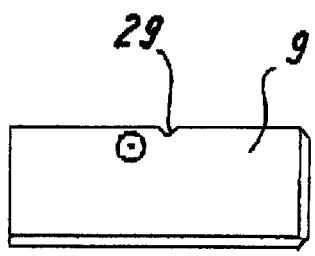
Figure 4A:
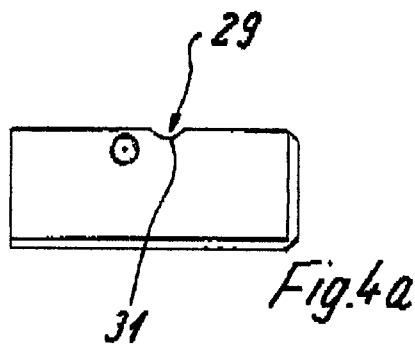
Figure 3B:
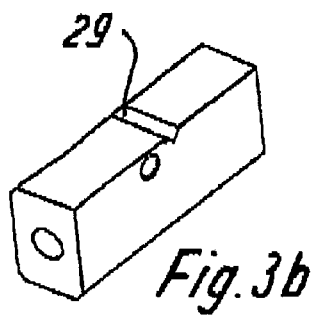
Figure 4B:
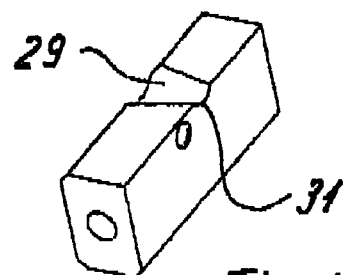
Figure 5A:
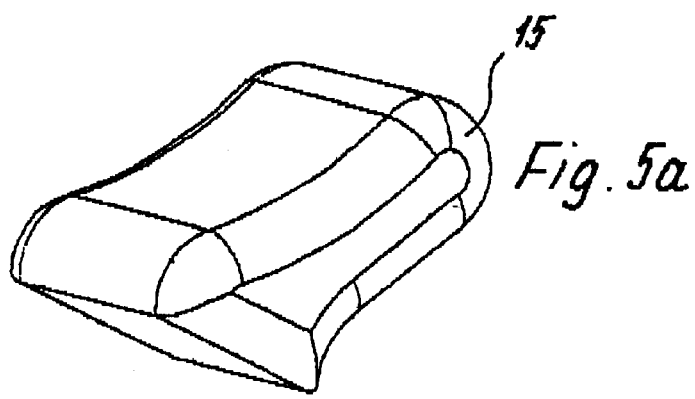
Figure 5B:
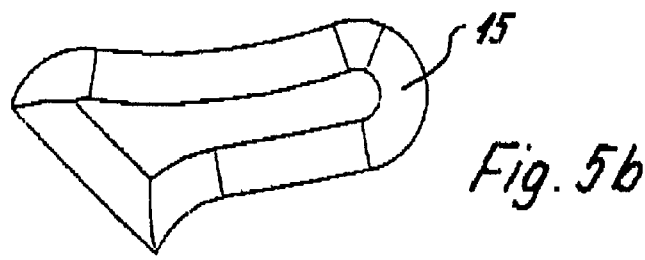
Figure 6A:
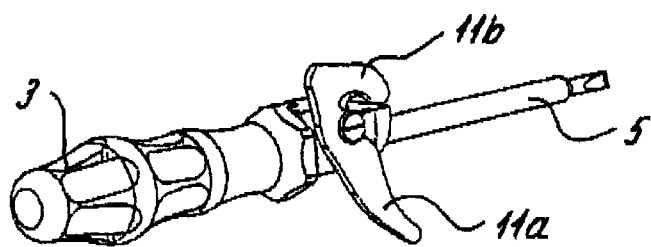
Figure 6B:
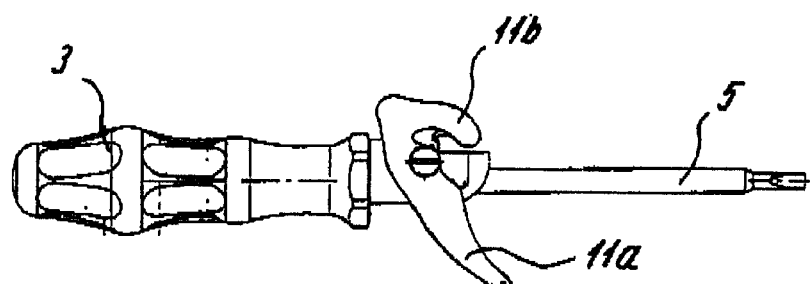
Figure 7A:
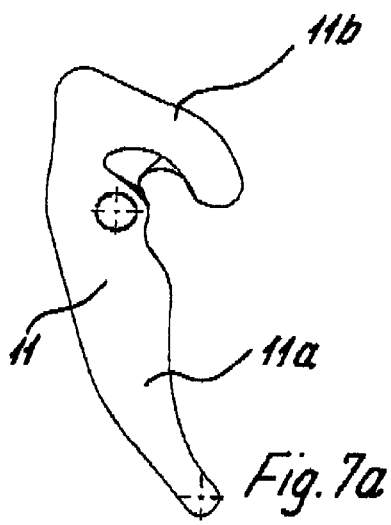
Figure 7B:
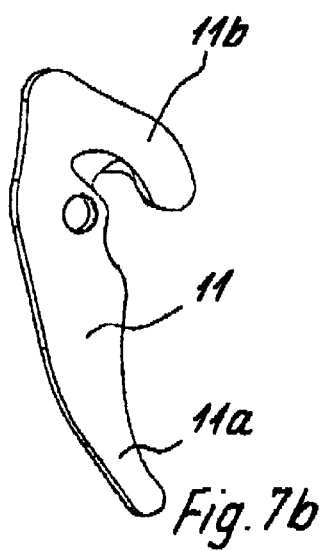

The following is a more detailed description of the invention with reference to the accompanying drawings of exemplified embodiments in which it is shown:

FIGS. 1a–1d various perspective views of a screwdriver with a first embodiment of a cutting device according to the invention, FIG. 2a the screwdriver of FIG. 1 without a cutting device;

FIGS. 2b–2d views of the clamping piece attachment of FIG. 1;

FIGS. 3a and 3b a variant of a clamping piece attachment;

FIGS. 4a and 4b a further variant of a clamping piece attachment;

FIGS. 5a and 5b views of an actuating button from FIG. 1;

FIGS. 6a and 6b views of a screwdriver with a second cutting device according to the invention;

FIGS. 7a and 7b views of an actuating lever from FIG. 6

Figure 10A:
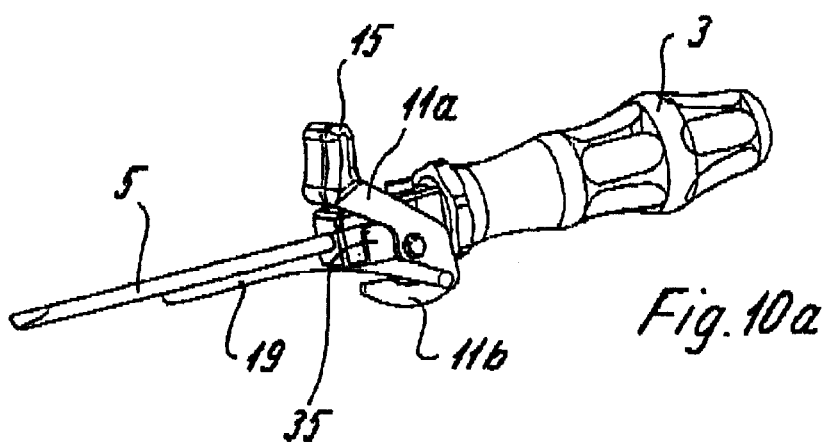
Figure 10B:
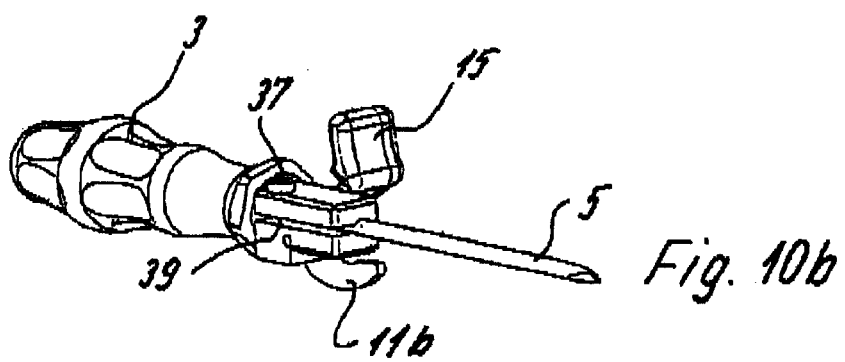
Figure 11A:
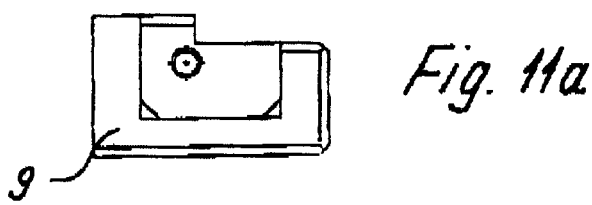

FIGS. 8 through 10a and b further variants of screwdrivers with cutting devices according to the invention;

FIG. 11a a view of the actuating lever from FIG. 10

Figure 11B:
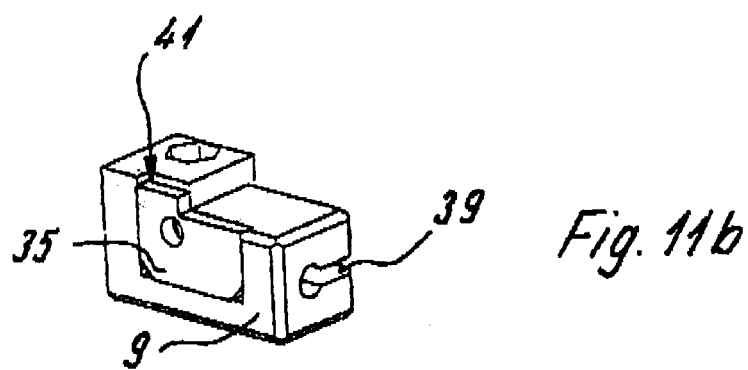

FIG. 11b views of the clamping piece attachment from FIG. 10 and cutting blade.

DETAILED DESCRIPTION OF THE INVENTION

FIG. 1 shows a screwdriver 1 with a screwdriver handle 3 and a shaft 5. Shown here is a commercially available screwdriver. This screwdriver is also depicted in FIG. 2a as a separate piece.

A cutting device 7 according to the invention is placed upon the screwdriver 1.

The cutting device 7 shows a clamping piece attachment 9, which is slipped over the shaft 5 of the screwdriver. An actuating lever is swingably supported at the clamping piece attachment 9. The actuating lever 11 shows two lever arms 11a and 11b, which extend to the opposite sides of a pivot bearing 13 configured at the clamping piece attachment 9. At the end of the lever arm 11 facing away from the pivot bearing 13 an actuating button 15 is configured. The lever arm which is opposite the lever arm 11a at the other side of the pivot bearing 13 has a curved shape, wherein the edge positioned toward the clamping piece attachment 9 of lever arm 11b is provided with a cutting edge 17 which is unitary with the lever arm.

With the cutting device 7 according to the invention it is possible in a simple manner to wire a terminal block with IDC connection.

Analog to FIG. 10, a cable 19 is inserted into the free space between the clamping piece attachment and the lever arm 11b with the cutting edge 17. Then—as in FIG. 1 for example by means or the thumb—the actuating button 15 is pressed down, so that the cable 19 is first clamped between the clamping piece attachment 9 and the lever arm 11b, thereby severing the cable The cable can then be inserted into a clamp, for example a terminal block, by means of a cutting—respectively IDC-connection device (not shown here).

The special advantage of the invention is that especially with IDC connections, besides a screwdriver for finalizing the connections, no further tool is actually needed any more. With the actual screwdriver the clamp can be actuated. The cutting device placed onto the screwdriver can be used for severing the cable.

From FIG. 2 it is seen, that a first clamping piece attachment 9 shows a central bore 21, which penetrates the clamping piece attachment centrally. This bore is used for slipping on the clamping piece onto the shaft. A bore 23 perpendicular to bore 21, which for example can be provided with an inner thread, serves however for the insertion of a clamping screw (not shown here), which when screwed in meets with the shaft 5 of the screwdriver 1 in bore 21, where it secures the clamping seat of the clamping piece attachment 9 on the screw driver.

A further bore 25, which also is configured in like manner essentially vertical to the bore 21 and which intersects the bore 21 and the bore 23, serves to receive a shaft 27 to support the actuating lever 11 at clamping piece attachment 9, that is, the shaft 27 forms the actual pivot bearing 13.

The clamping piece attachment 9 of FIG. 3 distinguishes from the clamping piece attachment 9 from FIG. 2 essentially in that a notch or a groove 29 is configured for the definitive lead of the cable at the clamping member attachment, which facilitates the insertion of the cable into the area between the cutting edge 17 and the clamping piece attachment 9.

Figure 9:
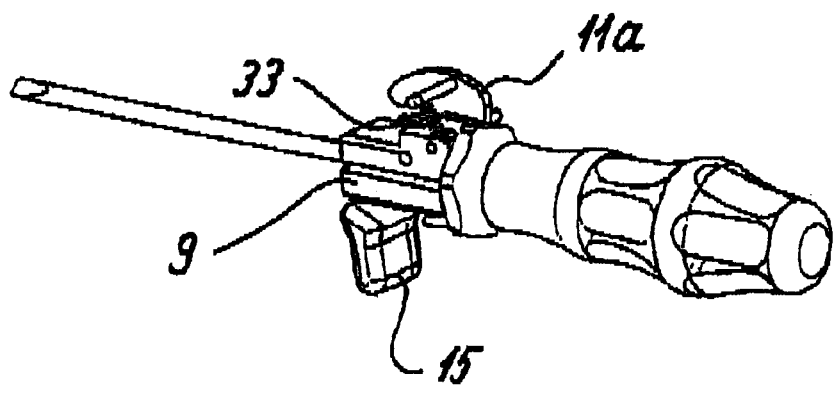

According to FIG. 9, the notch 29 is configured in such a way, that at the rim of the clamping piece attachment in the area of the notching, a kind of cutting edge 31 is formed, which either augments the function of the cutting edge 17 at lever arm 11b or that replaces this cutting edge function, when the actuating lever is configured with no such a cutting edge (e.g. FIGS. 6 and 10).

FIGS. 5a and 5b show the configuration of the actuating button 15 as a plastic form part, which is simply slipped onto the actuation lever, otherwise preferably from metal, or respectively the lever arm 11a.

FIG. 6a shows a further configuration of the invention, where there is no separately configured actuation button 15 at the actuation lever 11, respectively at lever arm 11a. Rather, the lever arm 11a exhibits a slightly curved shape for actuating by means of the forefinger. The embodiment of FIG. 6 varies from the embodiment of FIG. 1 essentially in that the actuation is preferably done by the forefinger instead of the thumb.

FIGS. 7a and 7b show separate front-and rear views of the actuation lever 11 from FIG. 6. The well recognizable elongated form of the lever arm 11a ensures a well-developed grip for the for-middle-and/or ring finger.

Figure 8:
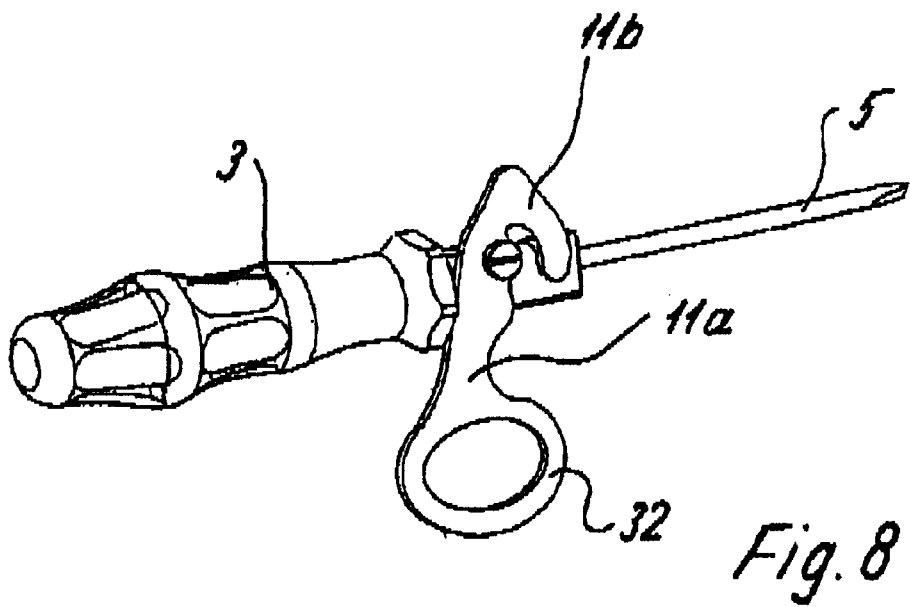

According to FIG. 8 in a further embodiment of the invention, the lever arm for actuating is in its end portion provided with a kind of ring or eyelet 32, which is likewise actuated with the forefinger.

FIG. 9 shows in addition to the already illustrated embodiments, a variation of the invention, where at the lever arm 11a, a spring is configured at the cutting device 7, between the clamping piece attachment 9 and the end of the actuating lever 11 facing away from the actuating button 15 and by which a resetting of actuating lever 11 is realized after the cable has been severed.

In the embodiments of FIG. 10 it is particularly well demonstrated (see FIG. 10a) how the severing of the cable 19 is carried out in the field.

The embodiment in FIG. 10 varies from the embodiment of FIG. 1 essentially in that, in addition to the cutting edge 17 at the actuating lever 11 or in lieu of this cutting edge, the clamping piece attachment 9, here shown as made from plastic, is provided with a cutting blade 35 which is placed onto the clamping piece attachment 9.

A further difference in this embodiment is that, as shown in FIG. 10b, the clamping piece attachment 9 is not only provided with a central bore 21, but also with a groove 34 which radially extends from the central bore 21. The tight clamping of the clamping piece attachment 9 is realized by means of a tensioning screw 37, which penetrates the clamping piece as well as the groove 39, so that when tightening the tensioning screw, both areas of the clamping piece attachment at each side of the groove is being pressed together, which thereby locks the clamping piece attachment at the shaft 5.

FIGS. 11a and 11b show the clamping piece 9 with groove 39 and the separate cutting knife 35, which functions here as cutting edge and which is inserted into a recess 41 at the side of the clamping piece attachment opposite of the groove. Thus, the cutting blade 35 is positioned, so to speak, between the clamping piece attachment 9 and the actuating lever 11.

REFERENCE NUMBER LIST

1 screwdriver
3 screwdriver handle
5 shaft
7 attachment
9 clamping piece attachment
11 actuating lever
11a lever arm
11b lever arm
13 pivot bearing
15 actuating button
17 cutting edge
19 cable
21 bore
23 bore
25 bore
27 shaft
29 groove
31 cutting edge
32 eyelet
33 spring
34 groove
35 cutting blade
37 tensioning screw
39 groove
41 recess

What is claimed is:

1. A cutting device for a tool, in particular for a screwdriver (1), with a clamping piece attachment (9), for slipping onto a shaft (5), in particular of the screwdriver (1) until it locks, wherein an actuating lever (11) is pivotally supported at the clamping piece attachment (9) and wherein at least one of the actuating lever (11) and the clamping piece attachment (9) is provided with a cutting edge (17, 31, 35) for cutting electrical cables or lines.

2. The cutting device according to claim 1, wherein the clamping piece attachment (9) at shaft (5) of screwdriver (1) can be clamped by means of a clamping or tensioning screw (37).

3. The cutting device according to claim 1, wherein the actuating lever (11) at the clamping piece attachment (9) is swingably supported and provided with a first lever arm (11a) for actuating and a second lever arm (11b) for cutting the conduit or cable between the clamping piece (99) and the actuating lever (11).

4. The cutting device according to claim 1, wherein the lever arm (11b) is configured in a curved shape.

5. The cutting device according to claim 1, wherein an actuating button (15) can be placed on the lever arm (11b).

6. The in device according to claim 1, wherein the clamping piece attachment (9) is penetrated by a central bore (21) for slipping the clamping piece attachment (9) onto the shaft (5) of the screwdriver.

7. The cutting device according to claim 1, wherein the clamping piece attachment is provided with a groove (29) for leading at least one of the cable and the conduit.

8. The cutting device according to claim 1, wherein the groove (29) in its outer area is configured in at least one of a blade-shape and a cutting-edge shape.

9. The cutting device according to claim 1, wherein the cutting edge is configured unitary with the clamping piece attachment (9) of the actuating lever (11).

10. The cutting device according to claim 1, wherein that the cutting edge is configured as a cutting blade (35) attachable to the clamping piece attachment (9) or to the actuating lever (11).

11. The cutting device according to claim 1, wherein the lever arm (11a) is configured for actuating by means of thumb or finger.

12. The cutting device according to claim 1, wherein a ring (32) is provided at the lever arm (11a) as grip for a finger.

13. The cutting device according to claim 1, wherein a spring (33) is provided between the lever arm (11a) and the clamping piece attachment (9) for resetting the actuating lever (11) after being actuated.

14. The cutting device according to claim 1, wherein the clamping piece attachment (9) is provided with a groove (39), which extends radially from the bore (21) and wherein the two areas on both sides of the groove of the clamping piece attachment (9) can be tightened against each other by means of a tensioning screw (37).

15. The cutting device according to claim 1, wherein the clamping piece attachment is provided with a recess for inserting the cutting blade.

16. The cutting device according to claim 1, wherein the clamping piece attachment is configured unitary with the shaft or the handle.

\* \* \* \* \*